United States Patent
Eckl

(10) Patent No.: US 9,616,764 B2
(45) Date of Patent: Apr. 11, 2017

(54) METHOD AND DEVICE FOR DYNAMICALLY ADJUSTING AN OPERATIONAL VOLTAGE FOR AN ELECTRIC MOTOR

(71) Applicant: Technische Universitaet Muenchen, Munich (DE)

(72) Inventor: Richard Eckl, Munich (DE)

(73) Assignee: Technische Universitaet Muenchen, Munich (DE)

( * ) Notice: Subject to any disclaimer, the term of this patent is extended or adjusted under 35 U.S.C. 154(b) by 137 days.

(21) Appl. No.: 14/418,878

(22) PCT Filed: Aug. 6, 2013

(86) PCT No.: PCT/EP2013/066490
§ 371 (c)(1),
(2) Date: Jan. 30, 2015

(87) PCT Pub. No.: WO2014/023736
PCT Pub. Date: Feb. 13, 2014

(65) Prior Publication Data
US 2015/0210183 A1 Jul. 30, 2015

(30) Foreign Application Priority Data
Aug. 7, 2012 (DE) .................. 10 2012 214 020

(51) Int. Cl.
*H02P 1/00* (2006.01)
*B60L 11/18* (2006.01)
(Continued)

(52) U.S. Cl.
CPC ........... *B60L 11/1866* (2013.01); *B60L 8/003* (2013.01); *B60L 11/1803* (2013.01);
(Continued)

(58) Field of Classification Search
USPC ........ 318/139, 105, 123; 320/121, 119, 117; 105/50
See application file for complete search history.

(56) References Cited

U.S. PATENT DOCUMENTS

| | | |
|---|---|---|
| 3,886,426 A | 5/1975 | Daggett |
| 4,563,621 A | 1/1986 | Moore |

(Continued)

FOREIGN PATENT DOCUMENTS

| | | |
|---|---|---|
| DE | 10 2010 041 014 A1 | 3/2012 |
| DE | 10 2009 027 228 A1 | 10/2012 |

(Continued)

OTHER PUBLICATIONS

English Translation for the Written Opinion for International Application No. PCT/EP2013/066490 dated Feb. 10, 2015.

*Primary Examiner* — Jorge L Carrasquillo
(74) *Attorney, Agent, or Firm* — Farjami & Farjami LLP

(57) ABSTRACT

Device and method for dynamically adjusting an operating voltage for an electric motor (9), which voltage is provided by a voltage source (1) formed in a modular manner, wherein modules (2-$i$) of the voltage source (1) formed in a modular manner are switched in dependence upon a rotational speed (n) of the electric motor (9) such that the overall degree of efficiency of the electric drive train is improved in a low rotational speed range of the electric motor (9), wherein the modules (2-$i$) of the voltage source (1) are switched by means of a switching network (3) which is composed of controllable power switches (5) and can be actuated by control signals which are generated by a switching controller (4) in dependence upon the rotational speed (n) of the electric motor (9).

15 Claims, 3 Drawing Sheets

(51) Int. Cl.
   *B60L 8/00*    (2006.01)
   *B60L 15/20*   (2006.01)
   *H02P 4/00*    (2006.01)
   *H02P 23/26*   (2016.01)

(52) U.S. Cl.
   CPC ....... *B60L 11/1857* (2013.01); *B60L 11/1861* (2013.01); *B60L 11/1887* (2013.01); *B60L 15/20* (2013.01); *H02P 4/00* (2013.01); *H02P 23/26* (2016.02); *B60L 2200/26* (2013.01); *B60L 2240/12* (2013.01); *B60L 2240/421* (2013.01); *B60L 2240/427* (2013.01); *B60L 2240/545* (2013.01); *Y02T 10/644* (2013.01); *Y02T 10/645* (2013.01); *Y02T 10/7044* (2013.01); *Y02T 10/7061* (2013.01); *Y02T 10/7083* (2013.01); *Y02T 10/72* (2013.01); *Y02T 10/7275* (2013.01); *Y02T 90/34* (2013.01)

(56) References Cited

U.S. PATENT DOCUMENTS

| | | | |
|---|---|---|---|
| 6,140,799 A | | 10/2000 | Thomasson |
| 7,208,894 B1 | * | 4/2007 | Earle .................. B60L 11/1805 180/65.31 |
| 2012/0013180 A1 | | 1/2012 | Muto |
| 2012/0119573 A1 | * | 5/2012 | Turudic .................... B60L 7/14 307/10.1 |
| 2012/0256568 A1 | * | 10/2012 | Lee ....................... H02J 7/0024 318/139 |
| 2014/0176024 A1 | | 6/2014 | Butzmann |

FOREIGN PATENT DOCUMENTS

| | | | |
|---|---|---|---|
| JP | 05236608 A | * | 9/1993 |
| JP | H 05236608 A | | 9/1993 |

\* cited by examiner

METHOD AND DEVICE FOR DYNAMICALLY ADJUSTING AN OPERATIONAL VOLTAGE FOR AN ELECTRIC MOTOR

This is a U.S. national phase application, which is based on, and claims priority from, PCT application Ser. No. PCT/EP2013/066490, filed Aug. 6, 2013, which claims priority from foreign application Ser. No. 10 2012 214 020.4, filed Aug. 7, 2012, in Germany.

The invention relates to a method and device for dynamically adjusting an operational voltage for an electric motor, in particular for an electric motor of an electric drive which can be used for example in an electric vehicle.

An electric drive comprises an electric motor which is controlled via power electronics which in turn draw the energy for the controlled electric motor from an energy store assembly or a voltage source.

A conventional energy store assembly for electric vehicles consists of a multiplicity of voltage sources, formed in a modular manner, in particular of battery cells, which are connected in series and in parallel. A particular switching configuration is produced for the energy store assembly or the voltage sources formed in a modular manner, which switching configuration remains fixed for the time of use. Furthermore, by connecting the modules of the voltage source, in particular the battery cells, a characteristic internal resistance of the energy store assembly is produced. However, this internal resistance can change during the course of use or operation of the energy store assembly, e.g., owing to ageing effects, in relation to the use. The electric voltage provided by the energy store assembly is applied to the power electronics of the electric drive unit as an input voltage.

A disadvantage of this conventional arrangement resides in the fact that in each load state of the electric motor in this conventional electric drive unit the degree of efficiency of the drive unit when travelling in a low rotational speed range is considerably lower than an optimum degree of efficiency designated for the electric motor. This is particularly the case when the electric motor of the drive unit is always supplied with a fixedly predetermined voltage from the energy store assembly which is considerably higher than required for the current operating point. This predetermined voltage is selected such that the entire rotational speed range of the electric motor can be utilized therewith.

If the output voltage of an electric energy store assembly is considerably higher than required for the current operating point of the electric motor, then switching losses occur to an increasing extent in the converter which leads to a reduction in the overall degree of efficiency of the electric drive train.

FIG. 1 shows electric losses and a degree of efficiency of a conventional electric motor as a function of a rotational speed n. As can be seen in FIG. 1, the degree of efficiency of the prime mover or of the electric motor is relatively low in the low rotational speed range of the electric motor and is considerably lower than the maximum degree of efficiency designated for the electric motor. In the example shown in FIG. 1, the electric motor achieves a maximum degree of efficiency of about 0.8 at about 75% of the maximum rotational speed.

Circuits are known in which, by selectively connecting voltage modules in parallel or in series, a direct current motor can be operated in different modes of operation. For example, if a voltage source formed in a modular manner comprises two voltage modules, in particular battery cells, in order to operate a direct current motor, then the direct current motor can either be operated at a low rotational speed and a higher torque, by connecting the voltage modules in parallel, or the direct current motor can be operated at a higher rotational speed and simultaneously a lower torque, by connecting the voltage modules or battery cells in series. However, with such a conventional arrangement it is not possible to operate synchronous motors, asynchronous motors or other types of electric motors with electronic commutation, also referred to as induction motors. Furthermore, this conventional arrangement is used merely to set particular operating or working points.

It is thus an object of the present invention to provide a method and device for dynamically adjusting an operating voltage in discrete stages for an electric motor, wherein the overall degree of efficiency of the electric drive train is increased in the partial load range of the electric motor.

This object is achieved in accordance with the invention by a device having the features stated in claim 1.

Accordingly, the invention provides a device for dynamically adjusting an operating voltage for an electric motor, which voltage is provided by a voltage source formed in a modular manner, wherein modules of the voltage source formed in a modular manner are switched in dependence upon a rotational speed of the electric motor, wherein rotational speed thresholds ($n_{SW}$) can be set between rotational speed ranges, at which the modules of the voltage source formed in a modular manner are switched in dependence upon the rotational speed (n) of the electric motor.

The modules of the voltage source are switched by means of a switching network which is composed of controllable power switches and can be actuated by control signals which are generated by a switching controller in dependence upon the rotational speed of the electric motor.

Therefore, the overall degree of efficiency of the electric drive train is increased since the switching losses in the converter are reduced by a lower input voltage during operation of the electric motor in the partial load range. The advantage in relation to the degree of efficiency is produced from the fact that the reduction in the switching losses over-compensates the increase in the forward resistance of the converter with the output power of the electric motor being the same.

In the device in accordance with the invention, the operating voltage for the electric motor is thus regulated in dependence upon the rotational speed of the electric motor, wherein a suitable switching stage for the voltage source formed in a modular manner is provided which means that the electric losses of the electric drive train or the electric drive unit are reduced.

The device in accordance with the invention for dynamically adjusting an operating voltage for an electric motor is thus a type of "automatic electric transmission" for a voltage source formed in a modular manner, wherein different switching stages can be set depending upon the rotational speed of the electric motor.

In one possible embodiment of the device in accordance with the invention, rotational speed thresholds ($n_{SW}$) are used as switching thresholds which are selected in the event of a change from an at least partial parallel connection to an at least partial series connection or in the event of a change from an at least partial series connection to an at least partial parallel connection such that the overall degree of efficiency of an electric drive train is identical in the case of an at least partial parallel connection and an at least partial series connection and this switching threshold is below the maximum rotational speed of the electric motor which is possible with the at least partial parallel connection.

In one possible embodiment of the device in accordance with the invention, the modules of the voltage source formed in a modular manner are additionally switched in dependence upon at least one further operating parameter.

In one possible variant of the embodiment, the modules are additionally connected in dependence upon the detected operating parameter, wherein the operating parameter includes a charging state of the voltage source, a temperature of the voltage source, a load time or an ageing state of the voltage source.

In one possible embodiment of the device in accordance with the invention, the modules of the voltage source are connected at least partially in parallel in a low rotational speed range of the electric motor for providing a low operating voltage for the electric motor.

In one possible embodiment of the device in accordance with the invention, the modules of the voltage source are connected at least partially in series in a high rotational speed range of the electric motor for providing a high operating voltage for the electric motor.

In a further possible embodiment of the device in accordance with the invention, the operating voltage for the electric motor is increased in a step-wise manner in a plurality of rotational speed ranges of the electric motor by switching the modules of the voltage source formed in a modular manner as the rotational speed of the electric motor increases.

In one possible embodiment of the device in accordance with the invention, the modules of the voltage source formed in a modular manner comprise battery cells.

In a further possible embodiment of the device in accordance with the invention, the modules of the voltage source formed in a modular manner comprise fuel cells.

In a further possible embodiment of the device in accordance with the invention, the modules of the voltage source formed in a modular manner comprise solar cells.

In one possible embodiment of the device in accordance with the invention, the switching network is integrated in the voltage source formed in a modular manner.

In a further possible embodiment of the device in accordance with the invention, a converter is provided which converts a direct current output by the voltage source formed in a modular manner into a single-phase or multiphase alternating current for the electric motor.

In a further possible embodiment of the device in accordance with the invention, the rotational speed thresholds can be set between rotational speed ranges, at which the modules of the voltage source formed in a modular manner are switched in dependence upon the rotational speed of the electric motor.

As switching thresholds, rotational speed thresholds ($n_{SW}$) or operating parameters equivalent thereto can be used and/or further operating parameters can be included. In principle, the switching thresholds are to be selected such that the switching process occurs when changing from the at least partial parallel connection to the at least partial series connection prior to the maximum rotational speed of the electric motor possible in the at least partial parallel connection being reached. Furthermore, the switching threshold is to be selected such that the at least partial parallel connection is maintained for as long as an advantageous degree of efficiency is produced overall in the electric drive train by the at least partial parallel connection. The advantageous degree of efficiency can be produced in the electric motor itself and/or in the converter. The switching threshold is thus set to the point at which the overall degree of efficiency of the electric drive train is identical in the at least partial parallel connection and the at least partial series connection and this switching threshold is below the maximum rotational speed of the electric motor possible in the at least partial parallel connection. For configurations having a plurality of switching stages, the switching threshold is selected or set in this manner in each stage.

When changing from the at least partial series connection to the at least partial parallel connection, the switching threshold is set to the point from which overall an advantageous degree of efficiency is produced by the at least partial parallel connection. This switching threshold must be below the maximum rotational speed of the electric motor possible with the at least partial parallel connection. For configurations having a plurality of switching stages, the switching threshold is selected or set in this manner in each stage.

In a further possible embodiment of the device in accordance with the invention, the device includes a unit which, among the individual modules of the voltage source, effects voltage equalization by so-called "active balancing" in order to prevent high equalizing currents when the parallel connection is implemented at least partially.

In a further possible embodiment of the device in accordance with the invention, equalizing currents, which can occur in the at least partial parallel connection, can be prevented by suitable passive components.

In a further possible embodiment, equalizing currents are prevented among individual modules of the voltage source in that in the operating point with the at least partial parallel connection, the modules used in parallel are used alternately and are not connected to each other directly in parallel.

The invention further provides an electric drive unit for a vehicle having the features stated in claim 12.

Accordingly, the invention provides an electric drive unit for a vehicle having a voltage source formed in a modular manner, a converter and an electric motor for driving the vehicle and having a device for gradually adjusting an operating voltage for the electric motor as the vehicle is travelling, wherein the device for gradually adjusting an operating voltage for the converter of the electric motor as the vehicle is travelling—the operating voltage which is provided by a voltage source formed in a modular manner—switches modules of the voltage source formed in a modular manner in dependence upon a rotational speed of the electric module such that an improvement in the overall degree of efficiency of the electric drive train occurs in a low rotational speed range of the electric motor, wherein the modules of the voltage source are switched by means of a switching network which is composed of controllable power switches and can be actuated by control signals which are generated by a switching controller in dependence upon the rotational speed of the electric motor.

In one possible embodiment of the electric drive unit in accordance with the invention, the electric motor is an induction motor.

In a further possible embodiment of the electric drive unit in accordance with the invention, the electric motor is a direct current electric motor.

In a further possible embodiment of the electric drive unit in accordance with the invention, a converter is provided which converts the operating voltage into a single-phase or multiphase alternating current for an induction electric motor.

The invention further provides an electric vehicle having the features stated in claim 13.

In one possible embodiment of the electric vehicle in accordance with the invention, the electric vehicle is an electric road vehicle, in particular an electric car.

In a further possible embodiment of the electric vehicle in accordance with the invention, the electric vehicle is an electric bike.

In a further possible embodiment of the electric vehicle in accordance with the invention, the electric vehicle is an electric watercraft.

In a further possible embodiment of the electric vehicle in accordance with the invention, the electric vehicle is an electric rail vehicle.

The invention further provides a voltage source for providing an operating voltage for an electric motor having the features stated in claim 14.

The invention further provides a method for dynamically adjusting an operating voltage for an electric motor having the features stated in claim 15.

Possible embodiments of the device in accordance with the invention and of the method in accordance with the invention for dynamically adjusting an operating voltage for an electric motor are explained in more detail hereinafter with reference to the attached figures, in which.

Figure 1:
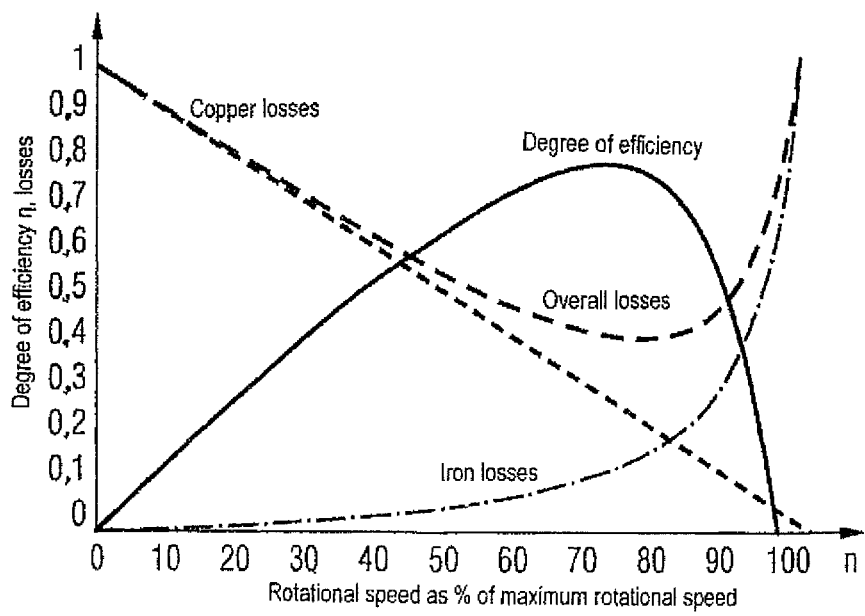
FIG. 1 shows a graph for illustrating the electric losses and a degree of efficiency in a conventional electric motor as a function of the rotational speed thereof.
Figure 2:
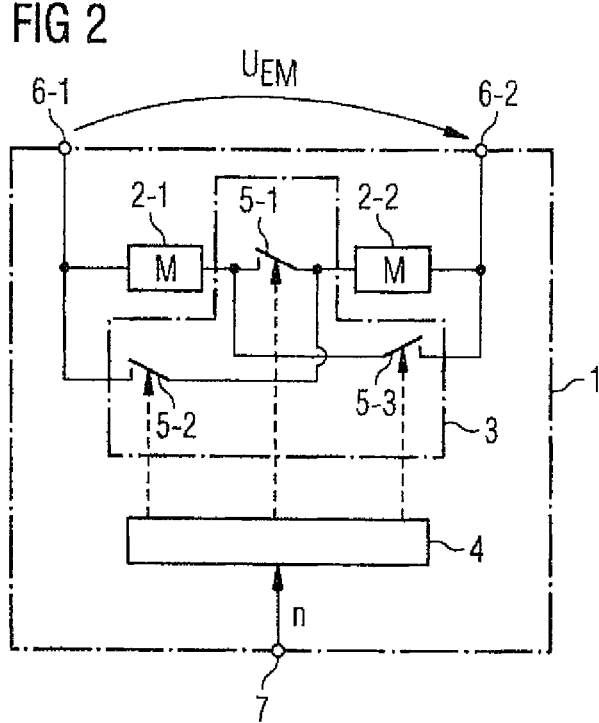
FIG. 2 shows a block diagram for illustrating an exemplified embodiment of the voltage source formed in a modular manner having a controllable switching network integrated therein in accordance with the invention.

As can be seen in FIG. 2, in the illustrated exemplified embodiment, a voltage source 1, formed in a modular manner, in accordance with the invention comprises a plurality of voltage modules 2-1, 2-2 which can be connected in series or in parallel using a switching network 3. In the simple exemplified embodiment illustrated in FIG. 2, the voltage source formed in a modular manner comprises two voltage modules 2-1, 2-2, wherein in other embodiments the number of voltage modules within the voltage source 1 formed in a modular manner can vary and there can be, for example, three, four, six, eight etc. voltage modules 2-i. The voltage modules 2-i can be, for example, battery cells of a car battery formed in a modular manner. Alternatively, the voltage modules 2-i can also be fuel cells or solar cells. In the exemplified embodiment illustrated in FIG. 2, the switching network 3 is integrated in the voltage source 1 formed in a modular manner and can be actuated via control lines by a switching controller 4 integrated in the voltage source 1 formed in a modular manner. The switching controller 4 controls switches 5-1, 5-2, 5-3 within the switching network 3 via control lines. The switches 5-i can be, in particular, power switches, e.g., MOSFETs, IGBTs or relays. The power switches preferably have a low contact and forward resistance. In the simple exemplified embodiment illustrated in FIG. 2, the two voltage modules 2-1, 2-2 can be switched between different switching states. For example, the two voltage modules 2-1, 2-2 are connected in series by closing the first power switch 5-1 whilst at the same time opening the two remaining switches 5-2, 5-3 of the switching network 3 and output a higher operating voltage for the electric motor 9 at the voltage outputs 6-1, 6-2 of the voltage source 1 formed in a modular manner. Conversely, the two voltage modules 2-1, 2-2 can be connected in parallel with one another by opening the switch 5-1 whilst at the same time closing the two remaining switches 5-2, 5-3 of the switching network 3. The switching controller integrated in the voltage source 1 formed in a modular manner obtains, via a control input 7, the rotational speed n of the electric motor 9 to be supplied with a voltage $U_{EM}$. In dependence upon the rotational speed n of the electric motor 9, the voltage modules 2-1, 2-2 of the voltage source 1 formed in a modular manner are connected such that the overall degree of efficiency of the electric drive train is improved or increased in a low rotational speed range of the electric motor 9. The voltage modules 2-i are switched by means of the switching network 3 which consists of controllable power switches 5-i and can be actuated by control signals generated by the switching controller 4 in dependence upon the rotational speed n of the electric motor 9.

The following relationship is applicable:
forward losses increase by additional switching elements of the electric transmission
switching losses of switching components of the converter unit decrease.

However, since the switching losses increase more than the forward losses do, the overall degree of efficiency of the electric drive train increases, wherein the switching losses in the converter unit decrease whilst higher forward losses are caused mainly by the electric transmission and higher currents in the case of a parallel connection whilst maintaining the same power output of the electric motor 9. The higher forward losses are produced from the ohmic resistances of additional lines and switching components. The increase in the degree of efficiency is thus dependent upon the switching elements used for the electric transmission. A forward resistance which is as low as possible is hereby advantageous.

The voltage source 1 formed in a modular manner and illustrated in FIG. 2 can comprise a multiplicity of different voltage modules 2-i which are interconnected differently or are connected dynamically during operation of the electric vehicle driven by the rotating electric motor 9. In that case, in a low rotational speed range of the electric motor, a plurality of voltage modules 2-i of the voltage source 1 formed in a modular manner are connected to each other in parallel instead of in series. In the low rotational speed range of the electric motor 9, this permits an operating voltage which is considerably lower than a nominal voltage of the voltage source 1 formed in a modular manner. By connecting voltage modules 2-i at least partially in parallel within the voltage source 1 formed in a modular manner, the overall degree of efficiency of the electric drive train is improved and thus results in lower losses. As a result, the degree of efficiency of the electric drive train is increased in a partial load range of the prime mover or of the electric motor 9 and the range of the electric vehicle operated by the electric motor 9 is thus increased.

In one possible embodiment, the rotational speed n of the electric motor 9 supplied to the controller 4 corresponds to a desired rotational speed or set rotational speed provided by an operator of the electric vehicle, e.g., by means of an accelerator pedal of the electric vehicle. Furthermore, it is possible that the rotational speed n of the electric motor 9 is detected by way of sensors and is supplied to the switching controller 4.

In the case of the device in accordance with the invention, modules or voltage modules 2-i of the voltage source formed in a modular manner are thus switched in dependence upon the instantaneous and/or desired rotational speed n of an electric motor, in order to achieve an improvement in the overall degree of efficiency of the electric drive train in a low rotational speed range of the electric motor. During constant travel of the electric vehicle at a particular rotational speed of the electric motor, which is lower than a predetermined rotational speed limit value, the energy store assembly or the voltage source 1 formed in a modular manner is switched accordingly using the switching network 3. If, in this state, the electric vehicle is now accelerated, initially the existing connection of the voltage modules 2-i within the voltage source 1 formed in a modular manner is maintained until the predetermined rotational speed limit value is reached. After the rotational speed limit value is reached, the connection of the voltage modules 2-i within the voltage source 1 formed in a modular manner is dynamically varied during travel of the electric vehicle. As soon as the limit value of the acceleration process is reached, individual voltage modules 2-i of the voltage source 1 formed in a modular manner are connected at least partially in series in order to achieve a higher operating voltage for the electric motor of the vehicle. In this manner, the voltage source 1 formed in a modular manner provides, in the start-up range, the prime mover or electric motor of the electric vehicle with an electric voltage considerably lower than the voltage for achieving a maximum speed of the vehicle. Therefore, the device for dynamically adjusting the operating voltage for the electric motor 9 improves the degree of efficiency for the electric motor and the converter in this start-up range. In order to achieve this function, it is additionally necessary to adapt the switching times of the power switches of the converter 10. This adaptation occurs at the same time as the switching of the switching network 3. In the case of the at least partial parallel connection, the times in which the power switches of the converter 10 are switched on are selected to be longer compared with the state involving the at least partial series connection, with the rotational speed of the electric motor 9 being the same in each case.

Figure 3:
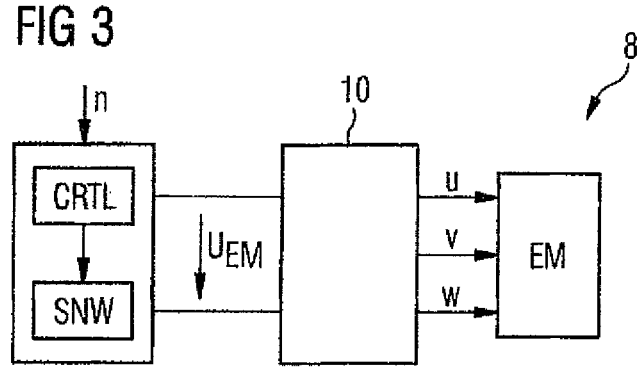
FIG. 3 shows a block diagram for illustrating an exemplified embodiment of an electric drive unit in accordance with the invention.

FIG. 3 shows a block diagram for illustrating an exemplified embodiment of an electric drive unit 8 in accordance with the invention for a vehicle having an electric motor 9 for driving the vehicle and having a voltage source 1 formed in a modular manner, as illustrated in FIG. 2. The voltage source 1 formed in a modular manner supplies an operating voltage $U_{EM}$ for the electric motor 9 in dependence upon a rotational speed n of the electric motor 9, wherein this operating voltage is applied to a converter 10 which converts a direct current output by the voltage source 1 formed in a modular manner into a multi-phase alternating current for an induction electric motor 9. The converter 10 can derive the information for adapting the switching times for the power switches from the input voltage or output voltage of the voltage source 1 formed in a modular manner or from the information regarding the rotational speed n of the electric motor 9. In the exemplified embodiment of the electric drive unit 8 illustrated in FIG. 3, the switching controller 4 and the switching network 3 are integrated in the voltage source 1 formed in a modular manner, wherein the switching controller 4 sets the rotational speed n of the induction electric motor 9. This rotational speed n can correspond, in one possible embodiment, to a set rotational speed set by the driver of the electric vehicle. In a further possible embodiment, the rotational speed n can be detected directly by way of sensors on the electric motor 9 using a rotational speed sensor. In the exemplified embodiment illustrated in FIG. 3, the electric motor 9 is an induction electric motor.

Figure 4:
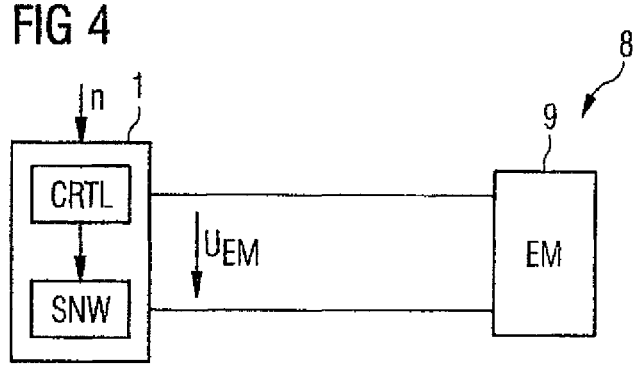
FIG. 4 shows a block diagram for illustrating a further exemplified embodiment of an electric drive unit in accordance with the invention.

FIG. 4 illustrates a further exemplified embodiment in which the voltage source 1 formed in a modular manner having the switching network 3 integrated therein and the switching controller 4 integrated therein is connected directly to a direct current electric motor 9 of the electric drive unit 8.

Figure 5:
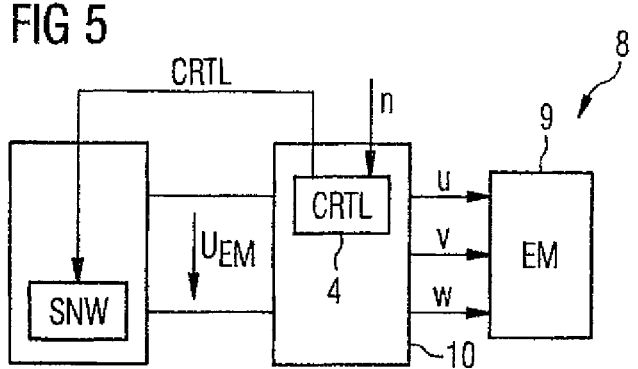
FIG. 5 shows a block diagram for illustrating a further exemplified embodiment of an electric drive unit in accordance with the invention.

FIG. 5 illustrates a further exemplified embodiment for an electric drive unit 8 in accordance with the invention. In the embodiment illustrated in FIG. 5, the control switch 4 for actuating the switching network 3 is not located in the voltage source 1 formed in a modular manner but in power electronics of the vehicle, comprising, for example, a converter 10 which generates a multi-phase alternating current for an induction electric motor 9.

Figure 6:
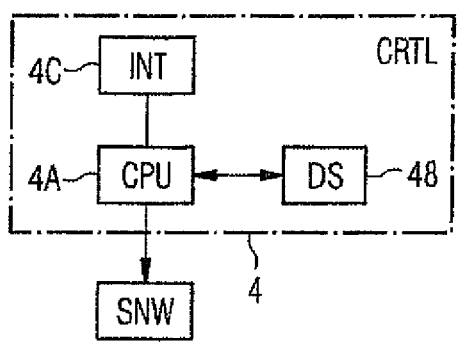
FIG. 6 shows a block diagram for illustrating an exemplified embodiment of a switching controller which can be integrated in the device in accordance with the invention.

FIG. 6 shows a block diagram for illustrating a simple exemplified embodiment for a switching controller 4 which actuates a switching network 3 of the voltage source 1 formed in a modular manner. In the simple exemplified embodiment illustrated in FIG. 6, the switching controller 4 comprises a microprocessor or a central processing unit 4A which has access to a data store 4B and can be connected to an interface or a data interface 4C. Different characteristic curves or thresholds for different electric motors 9 of the electric drive unit 8 can be stored in the data store 4B of the switching controller 4 in order to achieve rotational speed-dependent voltage characteristics of the voltage source 1 formed in a modular manner.

Figure 7:
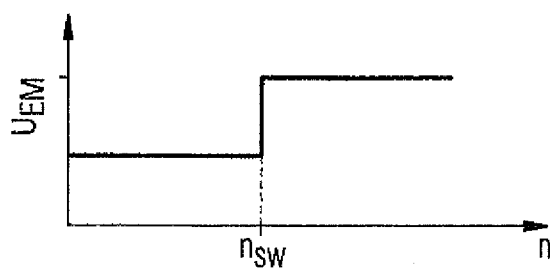
FIGS. 7, 8, 9 show graphs for illustrating voltage characteristic curves which can be used in the device in accordance with the invention and the method in accordance with the invention for dynamically adjusting an operating voltage for an electric motor.
Figure 8:
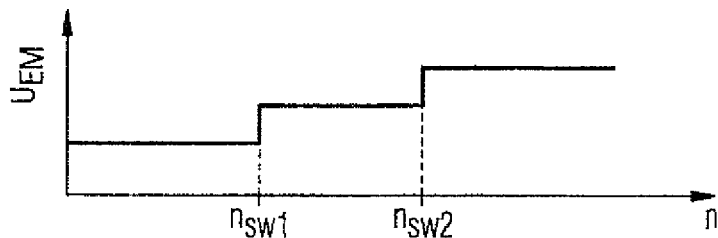
Figure 9:
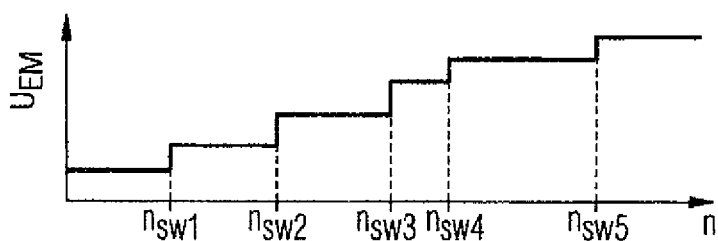

FIGS. 7, 8, 9 show by way of example the operating voltage output by the voltage source 1 formed in a modular manner for an electric motor 9 as a function of a rotational speed n of the electric motor 9. The operating voltages $U_{EM}$ illustrated in FIGS. 7, 8, 9 are generated by the voltage source 1 formed in a modular manner in that the power switches of the switching network 3 integrated therein are switched by the switching controller 4 in dependence upon the rotational speed n of the electric motor 9. As can be seen in FIGS. 7, 8, 9, in this manner the operating voltage $U_{EM}$ supplied by the voltage source 1 formed in a modular manner increases in a step-wise manner with the rotational speed n of the electric motor 9. In the simple example illustrated in FIG. 7, a rotational speed threshold $n_{SW}$ is provided. When the threshold $n_{SW}$ is exceeded, the operating voltage $U_{EM}$ is increased by the series connection of voltage modules 2-i. In a lower rotational speed range below the threshold $n_{SW}$, the operating voltage $U_{EM}$ of the voltage source 1 formed in a modular manner is reduced in that the voltage modules 2-i of the voltage source 1 formed in a modular manner are connected at least partially in parallel. In the lower rotational speed range below the threshold $n_{SW}$, the degree of efficiency of the drive unit 8 is increased in this manner. The thresholds $n_{SW}$ can turn out to be different for the change from the at least partial parallel connection to the at least partial series connection than for the change from the at least partial series connection to the at least partial parallel connection.

In other variants of the embodiment of the electric drive unit 8 in accordance with the invention, a plurality of rotational speed thresholds $n_{SW}$ can also be provided so that the operating voltage $U_{EM}$ for the electric motor 9 is increased in a step-wise manner, as illustrated by way of example in FIG. 8. In the example illustrated in FIG. 8, three rotational speed ranges are defined using two thresholds $n_{SW1}$, $n_{SW2}$, wherein the operating voltage is increased in a step-wise manner during travel of the electric vehicle depending upon the rotational speed n. The number of thresholds or rotational speed ranges can vary depending upon the type and design of the electric motor 9 and can be individually adapted to the requirements of the respective electric motor 9.

FIG. 9 shows an example with five different rotational speed thresholds and a corresponding number of rotational speed ranges of the electric motor 9. The number of rotational speed ranges can vary, as illustrated by way of example in FIG. 9. The height of the voltage steps between the different rotational speed ranges of the electric motor 9 can likewise be adapted to the electric motor 9.

The rotational speed thresholds $n_{SW}$ illustrated in FIGS. 7, 8, 9 or the corresponding characteristic curves can be stored in the data store 4B of the switching controller 4 and can be converted by the CPU 4A into corresponding control signals for the power switches 5-$i$ within the switching network 3. In one possible variant of the embodiment, the thresholds or characteristic curves can be registered in the data store 4B via the interface 4C of the switching controller 4. The data store 4B can be a fixed programmable data store inserted into the switching controller 4. The connection of the voltage modules 2-$i$ of the voltage source 1 formed in a modular manner can be changed using the controllable power switches 5-$i$ of the switching network 3 by control signals CRTL generated by the switching controller 4 individually for the electric motor 9 based on the switching characteristic curve, stored in the data store 4B, of the respective electric motor 9. The number of voltage modules 2-$i$ within the voltage source 1 formed in a modular manner can vary. For example, three or more voltage modules 2-$i$ within the voltage source 1 formed in a modular manner can also be connected in series or in parallel using the switching network 3. In this manner, a voltage range of up to a third of the nominal voltage is available, for example, as is a voltage range up to the nominal voltage of the energy store assembly of the voltage source formed in a modular manner.

The device in accordance with the invention can be used within an electric vehicle. The electric vehicle can be, for example, an electric bike, an electric road vehicle, an electric watercraft or an electric rail vehicle. Furthermore, the electric vehicle can also be a hybrid vehicle which has an internal combustion engine in addition to the electric motor.

In a further possible embodiment of the device in accordance with the invention, the modules or voltage modules 2-$i$ of the voltage source 1 formed in a modular manner are additionally switched in dependence upon at least one further operating parameter.

In one possible embodiment, the additional operating parameter—which occurs in dependence upon the switching of the modules 2-$i$ of the voltage source 1 formed in a modular manner—is detected by means of a sensor. The sensor detects, for example, a temperature T of the voltage source 1. The device in accordance with the invention can be used to achieve a higher overall degree of efficiency with the same voltage modules 2-$i$ or energy storage cells and the same number of voltage modules and the same prime mover or same electric motor. In this manner, the electric energy stored in the energy store assembly or voltage source 1 formed in a modular manner can be used more efficiently.

The device in accordance with the invention thus relates to power electronics for electric prime movers or electric motors which, in dependence upon a current rotational speed n of the prime mover or of the electric motor, switch the energy store assembly consisting of a plurality of voltage modules in a manner best suited for the respective state of the prime mover. For instance, the power electronics can connect the individual modules of the energy store assembly or voltage source 1 formed in a modular manner in parallel and/or in series. As a result, different input voltages are produced e.g., for a converter of the power electronics. The converter can convert the direct current supplied to the energy store assembly 1 into a correspondingly required alternating current for the prime mover or electric motor 9. Owing to the correct relationship between the states "switched on" and "switched off" of the power switches, in particular MOSFETs or IGBTs of the converter, the desired power for the prime mover 9 is then produced. The device in accordance with the invention takes into consideration the correct relationship between the states "switched on" and "switched off" of the power switches of the converter in that the instantaneous input voltage from the energy store assembly or voltage source 1 formed in a modular manner is dependent upon the selected switching times of the power switches of the converter, and vice-versa. When the input voltage for the converter or the output voltage of the voltage source 1 formed in a modular manner is changed, the switching times of the power switches of the converter are adapted in a suitable manner in order to ensure constant characteristics of the torque curve or rotational speed n of the electric motor 9 over the switching threshold. The device in accordance with the invention thus offers regulation which, in dependence upon the motor rotational speed n of the electric motor 9, provides suitable connecting of the modules 2-$i$ within the voltage source 1 formed in a modular manner and in addition suitably adapts the switching times of the converter. When the voltage modules or battery modules 2-$i$ within the voltage source 1 formed in a modular manner are connected in parallel, longer switch-on times of the switching elements or power switches 5-$i$ are provided than when the voltage modules 2-$i$ are connected in series, with the rotational speed of the prime mover 9 being the same. The switching times of the switching components or power switches 5-$i$ of the switching network 3 can be used to vary the rotational speed n of the prime mover or electric motor 9 in this manner. When the switch-on time is 100% of the maximum possible switch-on time, a maximum rotational speed $n_{max}$ of the electric motor 9 is achieved. If, for example, the voltage modules 2-$i$ of a voltage source 1 formed in a modular manner having two voltage modules 2-1, 2-2 are connected in parallel, only half the maximum voltage of the battery pack or the voltage source 1 formed in a modular manner is achieved. In this case, half the maximum rotational speed $n_{max}$ of the electric motor 9 is achieved with a switch-on time of 100%. If a switch is made to a series connection, the same rotational speed n of the electric motor 9 is achieved with a switch-on time of the switching elements or power switches of 50% of the maximum possible switch-on time. In the case of this switching step, the prime mover or electric motor 9 can further be accelerated to its maximum rotational speed $n_{max}$ possible with the voltage from the battery pack.

The device in accordance with the invention can be used to operate induction electric motors and also direct current motors. When operating a direct current motor, instead of a converter merely switching components are used, by means of which the correct relationship between the states "switched on" and "switched off" is set. The device in accordance with the invention for dynamically adjusting an operating voltage for an electric motor 9 forms an electric transmission for a voltage source 1 formed in a modular manner, wherein, in dependence upon a vehicle speed V or rotational speed n of a prime mover 9, different switching steps can be set in order to increase the degree of discharging efficiency.

The invention claimed is:

1. A device for dynamically adjusting an operating voltage for an electric motor, the device comprising:
   a voltage source formed in a modular manner and configured to provide the operating voltage;
   wherein modules of said voltage source formed in the modular manner are switched in dependence upon a rotational speed of said electric motor;
   wherein the modules of said voltage source are switched by means of a switching network which is composed of controllable power switches and can be actuated by control signals which are generated by a switching controller in dependence upon the rotational speed of said electric motor;
   wherein at least one rotational speed threshold is set between rotational speed ranges, at which the modules of said voltage source formed in the modular manner are switched in dependence upon the rotational speed of said electric motor;
   wherein the at least one rotational speed threshold is used as a switching threshold for changing from (1) an at least partial parallel connection of said modules of said voltage source to an at least partial series connection of said modules of said voltage source, or (2) the at least partial series connection of said modules of said voltage source to the at least partial parallel connection of said modules of said voltage source; and
   wherein said at least one rotational speed threshold is set such that the overall degree of efficiency of an electric drive train, which comprises said electric motor and a converter, is identical in the case of the at least partial parallel connection of said modules of said voltage source and the at least partial series connection of said modules of said voltage source, and is further set such that this at least one rotational speed threshold is below the maximum rotational speed of said electric motor possible with the corresponding at least partial parallel connection of said modules of said voltage source.

2. The device as claimed in claim 1, wherein the at least one rotational speed threshold is used as a switching threshold which is selected in the event of the change from the at least partial parallel connection to the at least partial series connection or in the event of the change from the at least partial series connection to the at least partial parallel connection such that the overall degree of efficiency of an electric drive train, which comprises said electric motor and the converter, is identical in the case of the at least partial parallel connection and the at least partial series connection and this switching threshold is below the maximum rotational speed of said electric motor which is possible with the at least partial parallel connection.

3. The device as claimed in claim 1, wherein modules of said voltage source formed in a modular manner are additionally switched in dependence upon at least one further operating parameter, wherein the further detected operating parameter is a charging state of said voltage source, a temperature of said voltage source, a load time or an ageing state of said voltage source.

4. The device as claimed in claim 1, wherein the modules of said voltage source are connected at least partially in parallel in a low rotational speed range of said electric motor for providing a low operating voltage for the converter and thus for said electric motor.

5. The device as claimed in claim 1, wherein the modules of said voltage source are connected at least partially in series in a high rotational speed range of said electric motor for providing a high operating voltage for the converter of said electric motor, wherein the operating voltage for said converter of said electric motor is increased in a step-wise manner in a plurality of rotational speed ranges of said electric motor by switching the modules of said voltage source formed in a modular manner as the rotational speed of said electric motor increases.

6. The device as claimed in claim 1, wherein the modules of said voltage source formed in a modular manner comprise battery cells, fuel cells or solar cells.

7. The device as claimed in claim 1, wherein the switching network comprises a unit for actively balancing the voltages of the modules of said voltage source formed in a modular manner.

8. The device as claimed in claim 1, wherein the switching network comprises passive components which prevent equalizing currents between modules of said voltage source formed in a modular manner which are connected in parallel.

9. The device as claimed in claim 1, wherein modules of said voltage source formed in a modular manner which are used in parallel are used alternately, whereby equalizing currents are prevented among the modules used in parallel.

10. The device as claimed in claim 1, wherein said switching network is integrated in said voltage source formed in a modular manner.

11. The device as claimed in claim 1, wherein in addition to the switching of the modules, the control times of the power switches of said converter are additionally adapted such that when the modules are at least partially connected in series, the power switches of said converter are switched on for a shorter period of time per switching cycle and when the modules are at least partially connected in parallel, the power switches of said converter are switched on for a longer period of time per switching cycle, with the rotational speed of said electric motor being the same in each case.

12. An electric drive unit for a vehicle having the device of claim 1 and having a converter and an electric motor for driving the vehicle, the device being for gradually adjusting an operating voltage for said converter of said electric motor as the vehicle is travelling.

13. An electric vehicle having the electric drive unit of claim 12, wherein the electric vehicle is an electric bike, an electric road vehicle, an electric watercraft or an electric rail vehicle.

14. A method for dynamically adjusting an operating voltage for an electric motor which is provided by a voltage source formed in a modular manner, the method comprising:
   switching modules of said voltage source in dependence upon a rotational speed of said electric motor, such that an overall degree of efficiency of an electric drive unit containing said electric motor is increased in a low rotational speed range of said electric motor;
   wherein at least one rotational speed threshold is used as a switching threshold for changing from (1) an at least partial parallel connection of said modules of said voltage source to an at least partial series connection of said modules of said voltage source, or (2) the at least partial series connection of said modules of said voltage source to the at least partial parallel connection of said modules of said voltage source;

wherein said at least one rotational speed threshold is set such that the overall degree of efficiency of an electric drive train, which comprises the electric motor and a converter, is identical in the case of the at least partial parallel connection of said modules of said voltage source and in the case of the at least partial series connection of said modules of said voltage source; and wherein said at least one rotational speed threshold is further set such that this at least one rotational speed threshold is below the maximum rotational speed of the electric motor possible with the at least partial parallel connection of said modules of said voltage source.

15. The method as claimed in claim 14, wherein the at least one rotational speed threshold is set between rotational speed ranges, at which the modules of the voltage source formed in a modular manner are switched in dependence upon the rotational speed of the electric motor, and wherein modules of said voltage source formed in a modular manner are additionally switched in dependence upon at least one further operating parameter, wherein the further detected operating parameter is a charging state of said voltage source, a temperature of said voltage source, a load time or an ageing state of said voltage source.

* * * * *